(12) United States Patent
Kajiwara et al.

(10) Patent No.: US 7,548,109 B2
(45) Date of Patent: Jun. 16, 2009

(54) VOLTAGE CONVERTER AND DISPLAY DEVICE COMPRISING A VOLTAGE CONVERTER

(75) Inventors: Hisayoshi Kajiwara, Yokohama (JP); Norio Mamba, Kawasaki (JP); Toshio Miyazawa, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 64 days.

(21) Appl. No.: 11/830,027

(22) Filed: Jul. 30, 2007

(65) Prior Publication Data

US 2008/0054992 A1 Mar. 6, 2008

(30) Foreign Application Priority Data

Aug. 30, 2006 (JP) .............................. 2006-233040

(51) Int. Cl.
*G05F 1/10* (2006.01)
*G05F 3/02* (2006.01)

(52) U.S. Cl. ...................................... 327/536; 345/204

(58) Field of Classification Search ................. 327/536, 327/537
See application file for complete search history.

(56) References Cited

U.S. PATENT DOCUMENTS

| | | | |
|---|---|---|---|
| 5,734,290 A * | 3/1998 | Chang et al. ................. | 327/536 |
| 5,754,476 A * | 5/1998 | Caser et al. ............. | 365/185.29 |
| 5,982,223 A * | 11/1999 | Park et al. .................... | 327/536 |
| 7,030,683 B2 * | 4/2006 | Pan et al. .................... | 327/536 |
| 2005/0206441 A1 | 9/2005 | Kimura | |
| 2007/0018935 A1 * | 1/2007 | Miyazawa et al. ............. | 345/98 |
| 2007/0040825 A1 * | 2/2007 | Mamba et al. .............. | 345/211 |

* cited by examiner

*Primary Examiner*—Lincoln Donovan
*Assistant Examiner*—Patrick O'Neill
(74) *Attorney, Agent, or Firm*—Antonelli, Terry, Stout & Kraus, LLP.

(57) ABSTRACT

A booster circuit of a two-step booster structure is manufactured by NMOS single channel processes and has two basic booster circuits to raise a gate voltage of a charge transfer transistor. The gate voltage of the transistor is first raised at one basic booster circuit, and this raised voltage is further raised at the other basic booster circuit.

13 Claims, 14 Drawing Sheets

VOLTAGE CONVERTER AND DISPLAY DEVICE COMPRISING A VOLTAGE CONVERTER

CLAIM OF PRIORITY

The present application claims priority from Japanese application serial No. 2006-233040 filed on Aug. 30, 2006, the content of which is hereby incorporated by reference into this application.

BACKGROUND OF THE INVENTION

The present invention relates to a voltage converter circuit for converting an input voltage and outputting the converted voltage and to a display device equipped with the voltage converter circuit, and more particularly to technologies effective for being applied to a driver circuit of a display device used with a portable device.

A liquid crystal display device of a thin film transistor (TFT) type having switching elements in a pixel area is widely used as a display device of a personal computer and the like. A display device of the TFT type is also used as a display device of a portable terminal device of a mobile phone and the like. A display device used with a portable terminal device is required to be more compact and have lower power consumption performance than a conventional liquid crystal display device.

A problem associated with compactness is a reduced space for mounting a driver circuit of a display device. A narrower peripheral area (narrow frame) than a display area is generally preferred. However, the peripheral area of the display area is an area to be used for mounting a driver circuit. The narrow frame forces the driver circuit to be more compact, and the mount area is restricted to a small space. Furthermore, a high resolution display device has been developed, and as the number of outputs from a driver circuit increases, a contact terminal pitch becomes narrower, posing a problem of lowered contact reliability.

In order to realize a driver circuit capable of being mounted in a smaller area and solving the problem of lowered contact reliability, a so-called driver circuit integrated with a display device has been developed and practically used. This display device is manufactured by forming the driver circuit on the same substrate on which switching elements are formed in a pixel area, by manufacture processes similar to those of forming the switching elements.

A display device of a portable terminal device is required to have low power consumption. It is also required to be driven by a portable power source such as a battery. However, various voltages are required for driving the display device. If a single low voltage of a battery or the like is used, it is necessary to generate voltages for driving the display device from a single power supply voltage by using a booster circuit or the like.

The booster circuit used for this purpose is disclosed, for example, in United States Patent Application Publication 2005/0206441 (JP-A-2005-304285). The disclosed booster circuit has a first transistor, a second transistor, a first capacitor element, a second capacitor element, a diode and an inverter, wherein one electrode of the first transistor is applied with a predetermined potential, an output side of the inverter is connected via the second capacitor element to the gate electrode of the first transistor and to one electrode of the second transistor, an input side of the inverter is connected to the other electrode of the first transistor via the first capacitor element and to the gate electrode of the second transistor, and the diode is connected in a forward direction between the other electrode of the first transistor and the other electrode of the second transistor.

SUMMARY OF THE INVENTION

However, the booster circuit written in United States Patent Application Publication 2005/0206441 is manufactured on the assumption that CMOS processes are used, and is not manufactured by using NMOS single channels. The influence of a variation in threshold voltages Vth is not considered sufficiently.

Namely, the circuit written in United States Patent Application Publication 2005/0206441 is manufactured on the assumption that CMOS processes are used and transistors of both N and P polarities are required, raising manufacture cost.

If the threshold value Vth becomes large due to a manufacture variation, the circuit written in United States Patent Application Publication 2005/0206441 cannot supply a sufficiently high gate voltage to a charge transfer switch, deteriorating the power supply circuit characteristics because of a switch-on resistance.

It is an object of the present invention to provide a voltage converter circuit having good characteristics capable of mitigating the influence of a threshold value variation, and a display device using the voltage converter circuit.

Pixel elements, switching elements for supplying video signals to the pixel electrodes, a drive circuit for supplying video signals to the switching elements, a drive circuit for outputting a scan signal, and a voltage converter circuit (e.g., booster circuit) are formed on the same substrate by NMOS single channel processes.

More specifically, a drain and a gate of a first transistor are connected to a voltage input terminal, and a source of the first transistor is connected to a first node; a drain of a second transistor is connected to the voltage input terminal, a gate of the second transistor is connected to a second node, and a source of the second transistor is connected to the first node; a drain of a third transistor is connected to the voltage input terminal, a gate of the third transistor is connected to the first node, and a source of the third transistor is connected to the second node; a drain of a fourth transistor is connected to the second node, a gate of the fourth transistor is connected to a third node, and a source of the fourth transistor is connected to a fourth node; a drain of a fifth transistor is connected to the second node, a gate of the fifth transistor is connected to a voltage output terminal, and a source of the fifth transistor is connected to the fourth node; a drain of a sixth transistor is connected to the second node, a gate of the sixth transistor is connected the fourth node, and a source of the sixth transistor is connected to the voltage output terminal; a drain and a gate of a seventh transistor are connected to the second node, and a source of the seventh transistor is connected to the third node; a drain of an eighth transistor is connected to the second node, a gate of the eighth transistor is connected to the fourth node, and a source of the eighth transistor is connected to the third node; a first capacitor element is connected between a first control signal input terminal and the first node; a second capacitor element is connected between a second control signal input terminal and the fourth node; a third capacitor element is connected between a third control signal input terminal and the third node; a fourth capacitor element is connected between a fourth control signal input terminal and the second node; and a fifth capacitor element is connected at least either between the voltage output terminal and ground or between the voltage input terminal ground.

The voltage converter circuit of a two-step booster structure has two basic booster circuits to raise a gate voltage of a charge transfer switch. The gate voltage of the charge transfer switch is first raised in one basic booster circuit, and this raised voltage is further raised in the other basic booster circuit.

According to the present invention, the circuit is manufactured by NMOS single channel processes, realizing lower cost than CMOS processes.

According to the present invention, a lowered gate voltage of a charge transfer switch to be caused by a threshold variation can be compensated so that good power supply circuit characteristics can be realized without being affected by a manufacture variation.

Other objects, features and advantages of the invention will become apparent from the following description of the embodiments of the invention taken in conjunction with the accompanying drawings.

DESCRIPTION OF THE EMBODIMENT

1. First Embodiment

Figure 1:
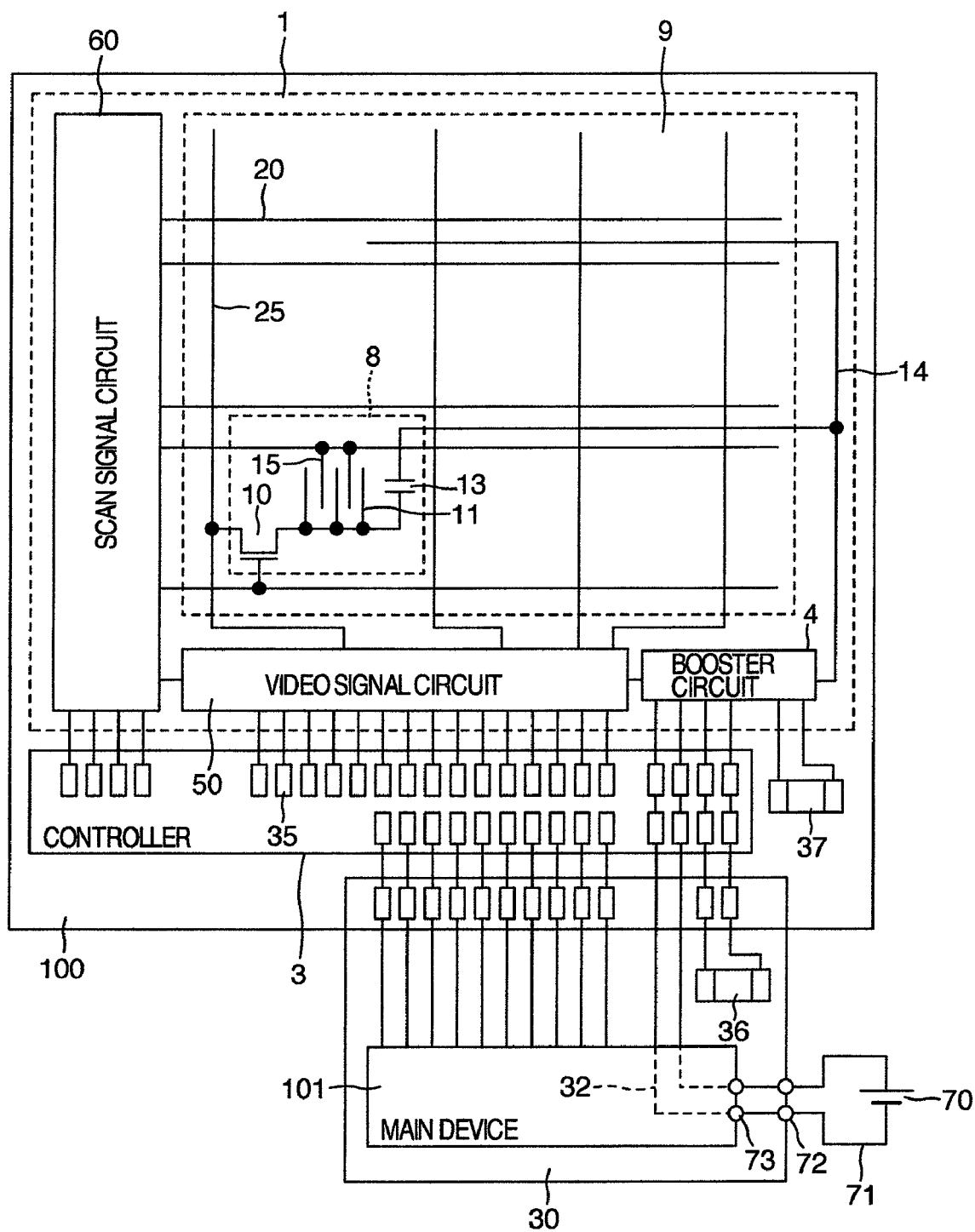
FIG. 1 is a schematic block diagram showing a display device according to an embodiment of the present invention.

Embodiments of the present invention will now be described in detail with reference to the accompanying drawings. In all Figures to be used for describing the embodiment, constituent elements having the same functions are represented by identical reference numerals, and the duplicated description thereof is omitted.

FIG. 1 is a block diagram showing the fundamental structure of a liquid crystal display device according to an embodiment of the present invention. As shown, the liquid crystal display device 100 is constituted of a liquid crystal display panel 1 and a controller 3. A main device 101 is connected via a flexible substrate 30 to the liquid crystal display device 100. The liquid crystal display device 100 is used as a display of the main device 101. The main device 101 uses a battery 70 as its power source. A power supply voltage is supplied to the liquid crystal display device 100 via wirings 32.

The liquid crystal display panel 1 is constituted of: a device substrate 2 made of an insulating substrate such as transparent glass and plastic and a semiconductor substrate; and an opposing substrate (not shown). The device substrate 2 and opposing substrate are stacked with a predetermined space therebetween, both the substrates are adhered by a seal member formed in a frame shape near the peripheral areas of the substrates, liquid crystal is filled in a space inside the seal member between the substrates via a liquid crystal filling port formed partially in the seal member, the substrates are sealed, and a polarizer plate is adhered to the outside of the substrates to form the liquid crystal panel.

Pixels 8 are disposed in a matrix shape on the device substrate 2 to form a display area 9. Each pixel 8 has a pixel electrode 11 and a thin film transistor 10 as a switching element. Each pixel is disposed at a cross point between each of a plurality of scan signal lines (or gate signal lines) 20 and each of a plurality of video signal lines (or drain signal lines) 25.

A source of the thin film transistor 10 of each pixel is connected to the pixel electrode 11, a drain is connected to the video signal line 25, and a gate is connected to the scan signal line 20. The thin film transistor 10 functions as a switch for supplying a display voltage (tonal voltage) to the pixel electrode 11.

Although the source and drain are reversely denoted depending upon a bias, the electrode connected to the video signal line 25 is called herein the drain.

The liquid crystal display panel shown in FIG. 1 is a so-called lateral electric field type that an opposing electrode 15 is formed on the device substrate 2. The embodiment is also applicable to a liquid crystal display panel of a so-called vertical electric field type that the opposing electrode 15 is formed on the opposing substrate.

A booster circuit 4, a video signal circuit 50 and a scan signal circuit 60 are formed on a transparent insulating substrate (such as a glass substrate and a resin substrate) constituting the device substrate 2 of the liquid crystal display panel 1. The controller 3 is made of an IC chip and directly mounted on the liquid crystal display panel 1. Digital signals (display data, clock signals, control signals and the like) output from the controller 3 are input via input terminals 35 to the booster circuit 4, video signal circuit 50 and scan signal circuit 60. The controller 3 is made of a semiconductor integrated circuit (LSI), and controls and drives the booster circuit 4, video signal circuit 50 and scan signal circuit 60 in accordance with externally supplied display control signals such as a clock signal, a display timing signal, a horizontal sync signal and a vertical sync signal, and display data (R, G, B).

The booster circuit 4, video signal circuit 50 and scan signal circuit 60 are formed by processes similar to those of forming thin film transistors 10. The scan signal circuit 60 drives the scan signal lines 20, the video signal circuit 50 drives the video signal lines 25, and the booster circuit 4 generates and supplies a voltage necessary for driving each circuit. Reference numerals 36 and 37 represent an external capacitor element. The capacitor element 36 is mounted on the flexible substrate 30. The capacitor element 37 is mounted on the liquid crystal display device 100 and connected to the liquid display panel 1 via terminals mounted on the liquid crystal display panel 1.

The scan signal circuit 60 sequentially supplies each scan signal line 20 with a selection scan voltage (scan signal) of a high level during each horizontal scan time, in accordance with a frame start instruction signal (FLM, hereinafter called also a start signal) and a shift clock (CL1) supplied from the controller 3. A plurality of thin film transistors connected to each scan signal line 20 of the liquid crystal display panel 1 turn on during one horizontal scan time.

The video signal circuit 50 outputs a tonal voltage corresponding to a tone to be displayed on the pixel, to the video signal line 25. As the thin film transistor 10 turns on, the tonal voltage (video signal) is supplied from the video signal line 25 to the pixel electrode 11. As the thin film transistor 10 turns off thereafter, the tonal voltage corresponding to the image to be displayed on the pixel is held at the pixel electrode 11.

Description will then be made on the booster circuit 4 used as the power supply circuit. A battery is generally used as the power source of a compact portable device such as a mobile phone. Because of a large amount of distribution, a battery having an output voltage of about 1.3 V to 3 V is generally used. It is therefore necessary to generate power supply voltages necessary for the liquid crystal display device by using the booster circuit 4.

Figure 2:
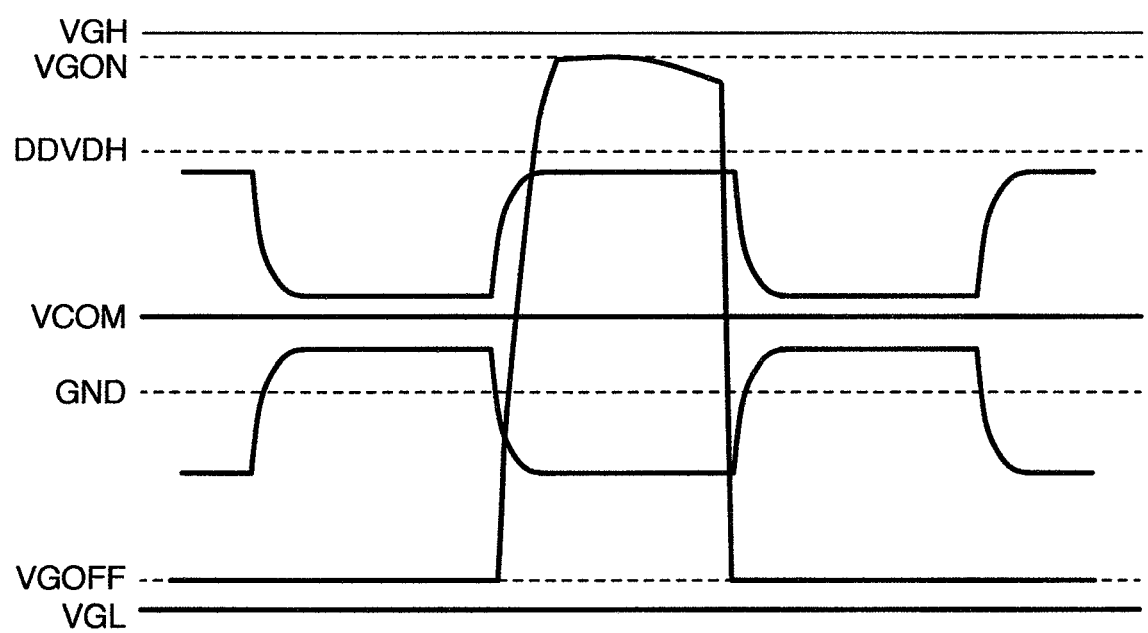
FIG. 2 is a schematic diagram showing the waveforms of drive signals of the display device of the embodiment of the invention.

FIG. 2 shows various signals in the liquid display device of a thin film transistor type and power supply voltages necessary for generating the signals. VGON shown in FIG. 2 represents a high voltage of a scan signal for turning on a thin film transistor (TFT). About 7 V to 15 V is required for VGON. VGOFF represents a low voltage of a scan signal for turning off a thin film transistor (TFT). About –2 V to –5 V is required for VGOFF. DDVDH represents a power supply voltage for the video signal circuit 50 and scan signal circuit 60 shown in FIG. 2.

Of the power supply voltages necessary for the liquid crystal display device, a high voltage VGH and a low voltage VGL for the scan signal circuit are generated by using the booster circuit 4 of a charge pump type of the present invention, and other power supply voltages are generated by dividing the voltage generated by the booster circuit.

With reference to FIGS. 3 to 6, description will then be made on a high voltage VGH booster circuit and a low voltage VGL booster circuit of the embodiment.

Figure 3:
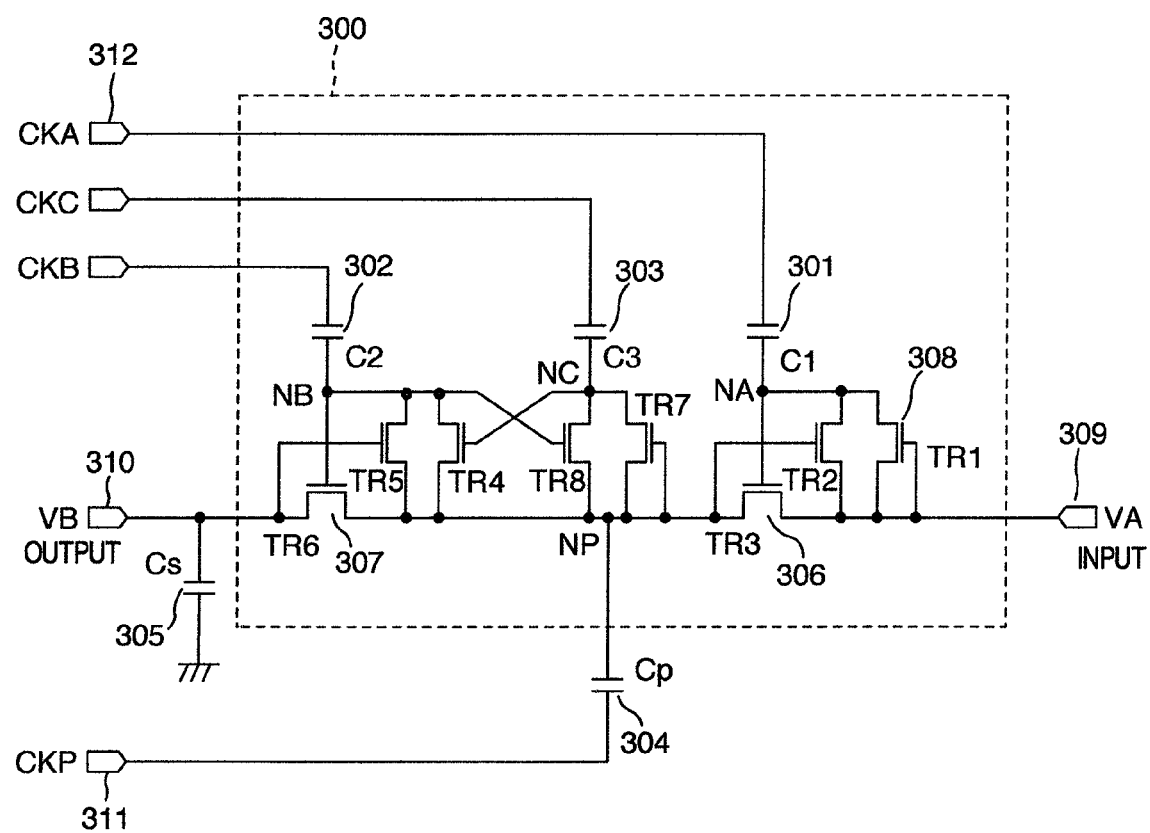
FIG. 3 is a diagram showing a high voltage VGH booster circuit according to a first embodiment of the present invention.

FIG. 3 shows the high voltage VGH booster circuit. The high voltage VGH booster circuit is constituted of a pumping capacitor element Cp, a stabilizing capacitor element Cs, booster capacitor elements C1, C2 and C3 and transistors TR1 to TR8. The transistors TR1 to TR8 are formed by NMOS processes. TR3 and TR6 represent charge transfer switches. In this booster circuit, after an input voltage VA is charged once to the pumping capacitor element Cp via the charge transfer switch TR3, a potential at a node NP is raised by using a pumping clock CKP, and a high voltage VGH is supplied to the output side via the switch TR6. The present invention is not limited to the circuit structure of the embodiment, but any other circuits may be used if the above-described function can be realized.

A circuit constituted of the transistor TR1 and capacitor element C1 is a circuit for raising a gate voltage of the input side charge transfer switch TR3.

A circuit constituted of the transistor TR4 and capacitor element C2 is a circuit for raising a gate voltage of the output side charge transfer switch TR6. A circuit constituted of the transistor TR7 and capacitor element C3 is a circuit for raising a gate voltage of TR4 to raise an initial voltage across C2. As the gate voltages of transistors TR2, TR5 and TR8 become high, the transistors TR3, TR6 and TR4 are diode-connected so that charges are prevented from flowing reversely via these transistors.

Figure 4:
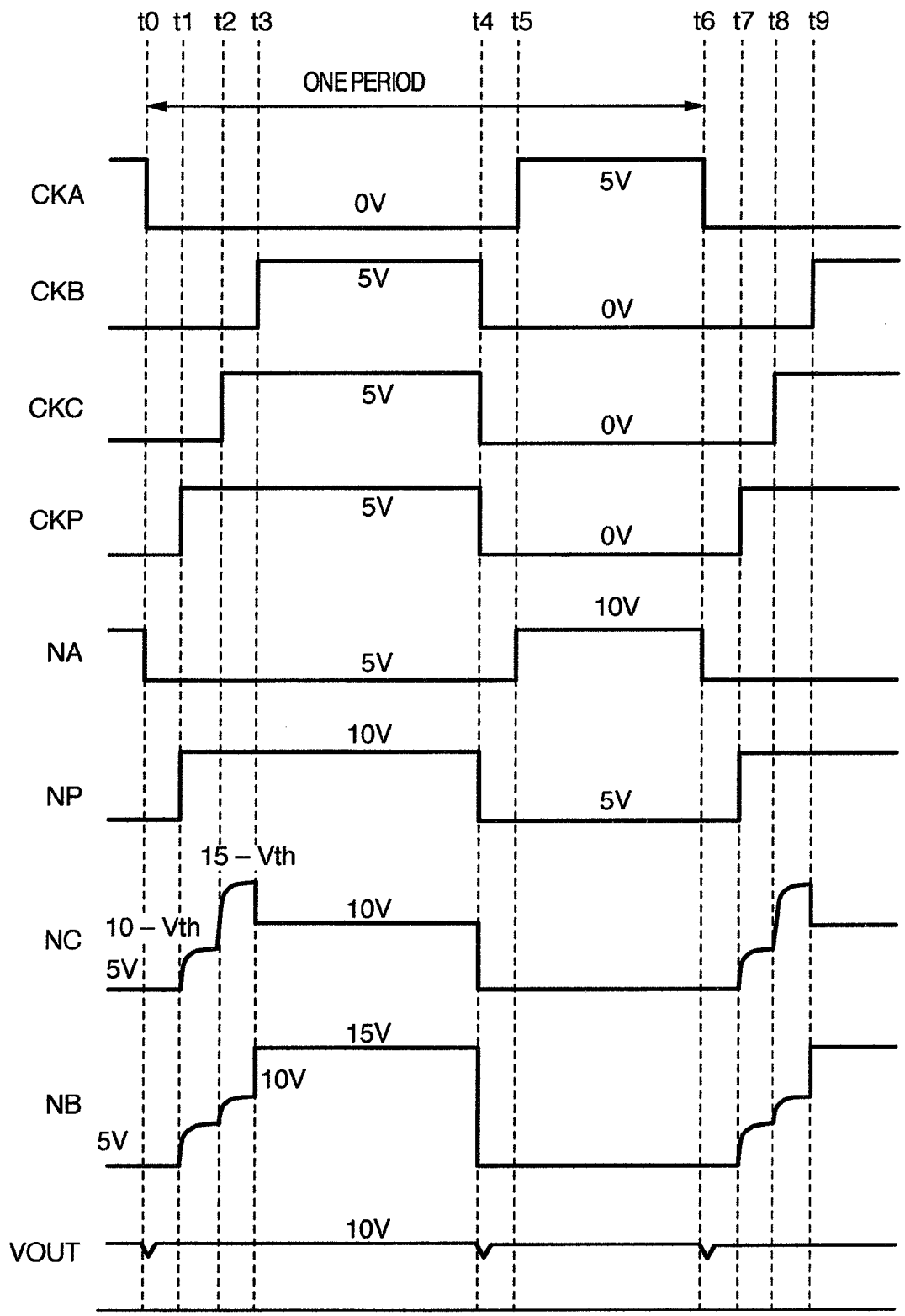
FIG. 4 is a schematic diagram showing the waveforms of drive signals of the high voltage VGH booster circuit of the first embodiment of the present invention.

The details of the operation of the VGH booster circuit will be described in detail with reference to FIGS. 3 and 4. Timings of control clocks CKA, CKB, CKC and CKP for the power source circuit are set as shown in FIG. 4. Description will be made assuming that an input voltage VA is 5 V and an amplitude of the control clocks CKA, CKB, CKC and CKP is 5 Vpp. As the input voltage VA of 5 V is applied, the input voltage lower by Vth is charged to the capacitor element C1 via the diode-connected transistor TR1. As the clock CKA becomes high at time t5, the node NA is raised to 10–Vth so that TR3 turns on and the input voltage VA of 5 V is charged to the capacitor element Cp. Next, as the clock CKA becomes low at time t6 (t0), TR3 turns off, and as CKP becomes high at time t7 (t1), the node NP is raised to 10 V. Therefore, the node NC is charged near to 10–Vth via TR7. As CKC becomes high at t8 (t2), NC is charged once up to 15–Vth. As CKB becomes high at t9 (t3), NB (gate voltage of TR6) is charged up to 15–Vth so that TR6 turns on. Therefore, charges in Cp are supplied to the output side via TR6. By repeating these operations, a supply of charges from the input side to the output side is repeated so that a constant voltage of 10 V is supplied to the output side.

In this booster circuit, since the potential at the node NC is charged to about 10–Vth before a voltage booster operation by the clock CKC, the potential at the node NC can be raised to 10+Vth or higher by the voltage booster operation by CKC. Therefore, the potential at NB can be set beforehand near to 10 V, and a voltage at NB (gate voltage of TR6) can be raised sufficiently by a voltage booster operation by CKB even if Vth is high. It is therefore possible to lower an on-resistance of TR6 so that large current can be supplied to the output side without lowering the output voltage greatly.

Figure 5:
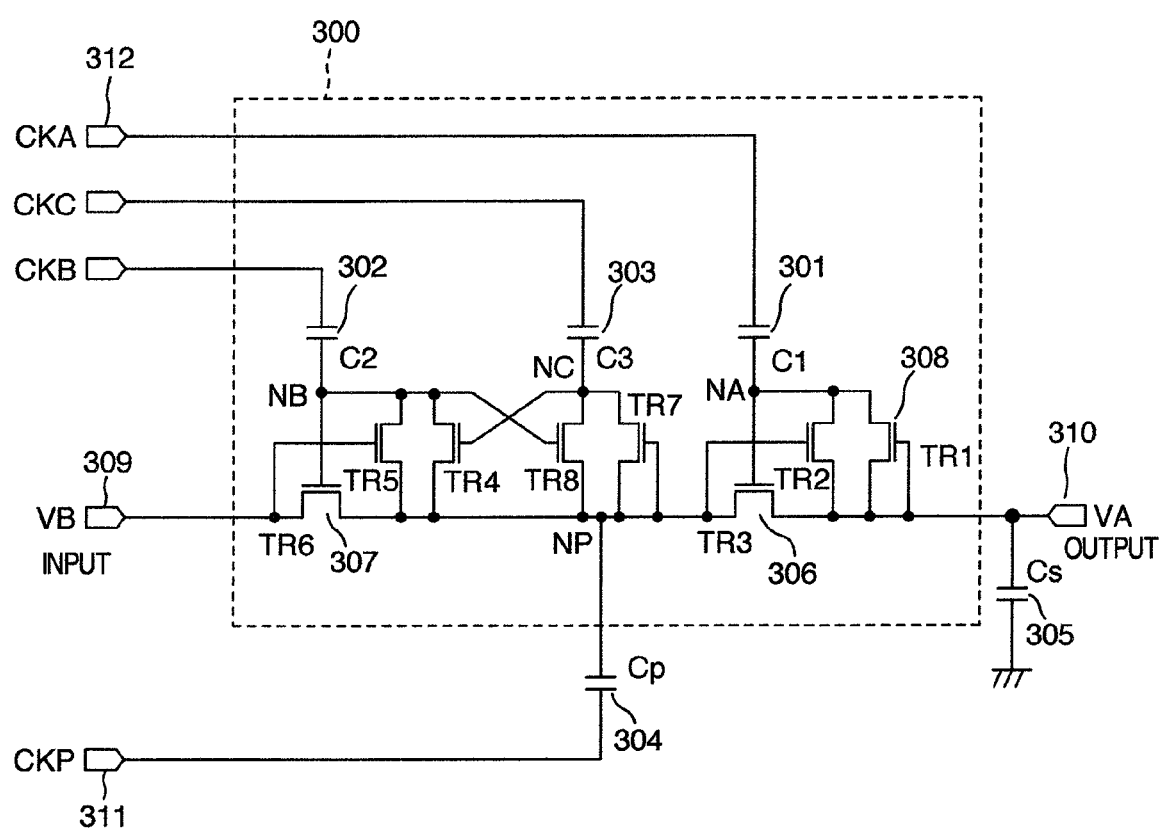
FIG. 5 is a diagram showing a low voltage VGL booster circuit according to the first embodiment of the present invention.

FIG. 5 shows the low voltage VGL booster circuit. The low voltage VGL booster circuit can be realized by using the same circuit structure 300 as that of the VGH booster circuit, and reversing the relation between input and output. Control clocks CKA, CKB, CKC and CKP are the same as those of VGH.

In the VGL booster circuit, as an input voltage VB is applied and CKB becomes high, the input voltage VB is charged to the node NP. Next, as TR6 turns off and CKP becomes low, the potential at NP lowers. Thereafter, TR3 turns off and current flows from the output side into Cp. Charges flowed into Cp are discharged to the input side as TR6 turns on next. By repeating these operations, an output voltage VA gradually lowers and a constant negative voltage can be supplied to the output side. For example, if the input voltage VB is 3 V and an amplitude of CKP is 5 Vpp, an output voltage VA in a stable state is 3 V–5 V=–2V.

Figure 6:
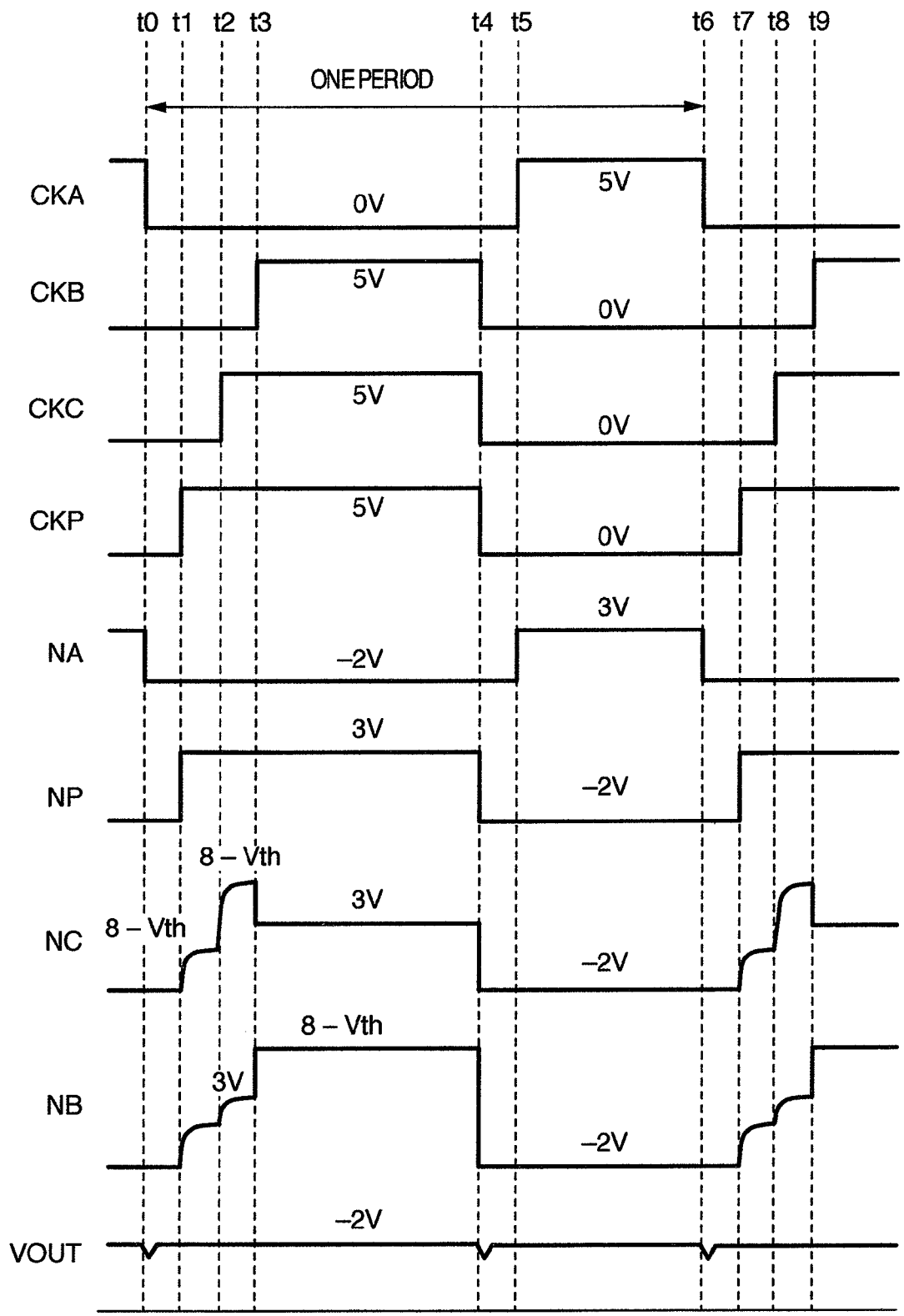
FIG. 6 is a schematic diagram showing the waveforms of drive signals of the low voltage VGL booster circuit of the first embodiment of the present invention.

The details of the operation of the VGL booster circuit will be given with reference to FIGS. 5 and 6. Timings of control clocks CKA, CKB, CKC and CKP are the same as those of high voltage VGH. Description will be made assuming that an input voltage VB is 3 V and an amplitude of the control clocks CKA, CKB, CKC and CKP is 5 Vpp. First, after an input voltage VB=3 V is applied in the state that the pumping clock CKP is high, TR6 turns on as CKB becomes high at time t3 (t9) so that the node NP is discharged to the input voltage VB=3 V (a voltage across Cp is 3 V−5 V=−2 V). Next, as CKB and CKC become low at time t4, TR6 turns off. At this time, CKP becomes also low so that NP is −2 V. As CKA becomes high at time t5, the node NA is raised to 3 V so that TR3 turns on and current flows into Cp from the output side. Therefore, the output voltage is −2 V. As CKA becomes low at time t6 (t0), TR3 turns off, and as CKP becomes high at time t7 (t1), the node NP is raised to 3 V. At this time, NC is charged near to 3−Vth via TR7, and as CKC becomes high at time t8 (t2), NC is charged once up to 8−Vth. As CKB becomes high at time t9 (t3), NB (gate voltage of TR6) is raised to 8 V so that TR6 turns on. Therefore, charges flowed into Cp from the output side while TR3 turns on are discharged to the input side via TR6. By repeating the above-described operations, a constant load voltage VGL=−2 V can be supplied to the output side.

Similar to the VGH booster circuit, also in the VGL booster circuit, since the booster circuit using C3 and TR7 can raise an initial voltage at NB, the gate voltage of TR6 can be made high during a booster operation by CKB. Therefore, the on-resistance of TR6 can be made sufficiently small so that large current can be supplied to the output side without changing the output voltage greatly.

Figure 7:
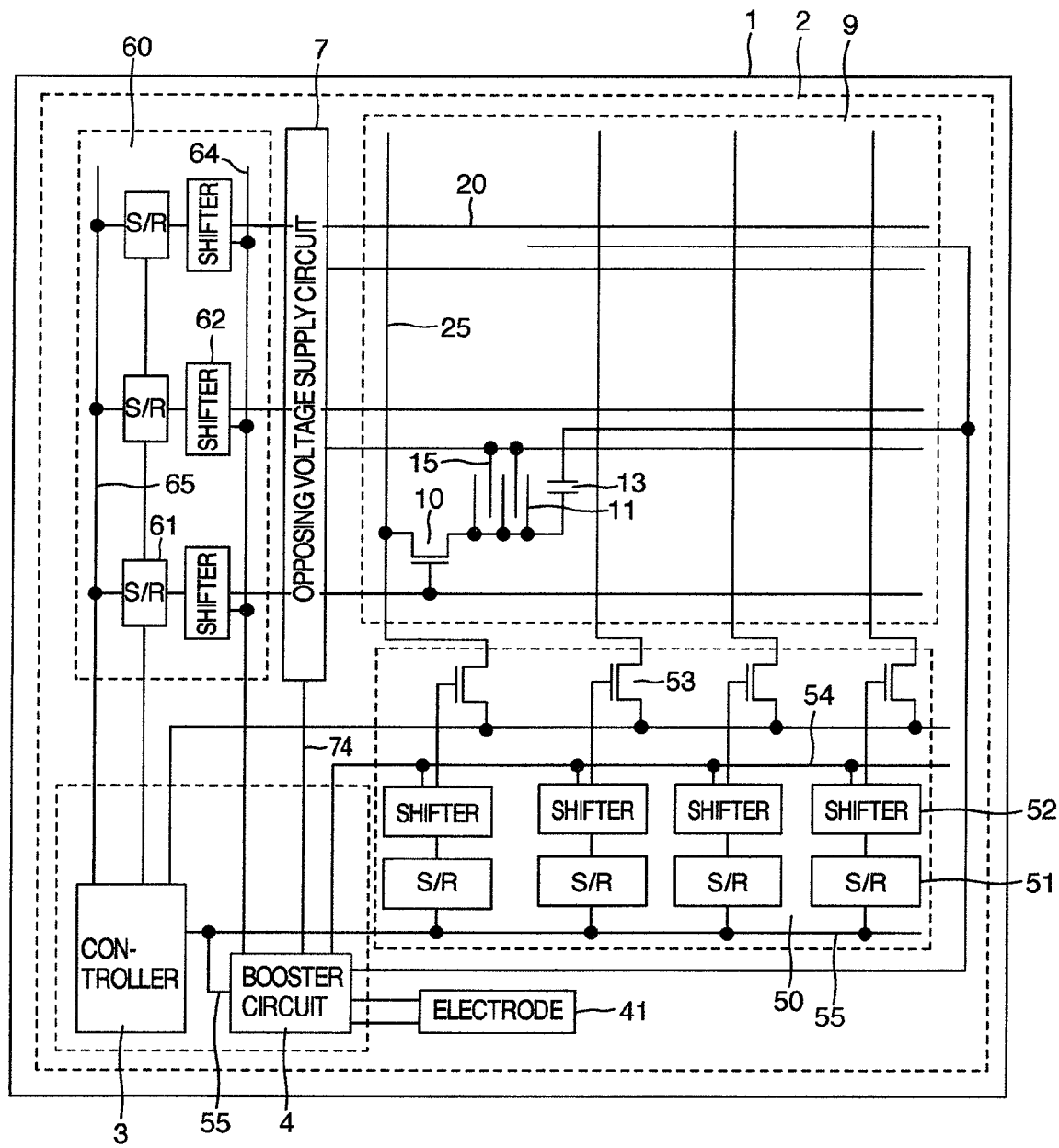
FIG. 7 is a schematic block diagram showing a liquid crystal display panel according to an embodiment of the present invention.

Next, with reference to FIG. 7, description will be made on the driver circuits of the liquid crystal display panel 1 to which the booster circuit of the present invention is applied. FIG. 7 is a block diagram showing the fundamental structure of the liquid crystal display panel according to the embodiment of the present invention. As shown in FIG. 7, the liquid crystal display panel 1 has the insulating substrate (device substrate) 2 made of transparent glass or plastic. The pixels 8 are disposed in a matrix shape on the insulating substrate 2 to form the display area 9. Each pixel 8 has the pixel electrode 11 and switching element 10.

The video signal circuit 50, scan signal circuit 60 and booster circuit 4 are formed in the peripheral area of the display area 9 along the sides of the insulating substrate 2. Since the video signal circuit 50, scan signal circuit 60 and booster circuit 4 are formed by processes similar to those of forming the switching elements 10, they can be made more compact than a semiconductor chip formed by different processes.

Semiconductor layers constituting the video signal circuit 50, scan signal circuit 60, booster circuit 4 and switching elements 10 are made of polysilicon films which are formed by supplying energy by laser radiation to an amorphous silicon film deposited on the insulating substrate 2 by CVD or the like and have a crystalline grain diameter larger than that of the amorphous silicon film because of re-crystallization and the like.

The scan signal lines 20 extend to the display area from the scan signal circuit 60. Each scan signal line 20 is electrically connected to the control terminals of the switching elements 10. The scan signal circuit 60 outputs a scan signal to each scan signal line 20 to turn on and off the switching elements 10.

The scan signal circuit 60 has shift register circuits 61 each outputting a pulse signal to the scan signal line 20, the pulse signal having a voltage to turn on the switching elements 10 during one horizontal period.

The shift register circuit 61 may be driven by a high voltage raised by the booster circuit 4, or may be driven by a low voltage. In the latter case, a pulse signal output from the shift register circuit is converted into a high voltage pulse by a level shifter circuit 62 to be output to the scan signal line 20. In this case, the booster circuit 4 and each level shifter circuit 62 are electrically connected by high voltage wirings 64. Wirings 65 are signal lines for supplying transfer clocks to the shift register circuits 61.

An opposing voltage supply circuit 7 is disposed adjacent to the scan signal circuit 60. The opposing voltage supply circuit 7 supplies an opposing voltage to each of divided opposing voltage supply lines, and is an effective circuit to be applied to a liquid crystal display device of an in-plane-switching (IPS) mode having opposing electrodes separated for respective pixels. The booster circuit 4 and opposing voltage supply circuit 7 are electrically connected by high voltage wirings 74.

The video signal lines 25 extend to the display area 9 from the video signal circuit 50. Each video signal line 25 is connected to the input terminals of the switching elements 10. The video signal circuit 50 outputs a video signal to the video signal line 25 and writes a video signal to the pixel electrode 11 via the switching element 10 turned on by the scan signal.

The video signal circuit 50 has output gates 53 which output video signals supplied externally to the video signal lines 25, synchronously with timing pulses output from shift register circuits 51. If the voltage range of a video signal, such as a video signal directly supplied from an external of the liquid crystal display device 1, is broad, a voltage output from the shift register 51 may be insufficient for turning on the output gate 53. To avoid this, level shifter circuits 52 are used to output a voltage sufficient for turning on the output gate 53 in the voltage range of the video signal. The video signal circuit 50 and booster circuit 4 are electrically connected also by high voltage wirings 54.

In the circuit shown in FIG. 7, both a transfer pulse of the shift resister circuit 51 and a booster pulse of the booster circuit 4 are used, and the shift register circuits 51 and booster circuit 4 are electrically connected by transfer pulse wirings 55. Electrodes 41 for an output capacitor are formed on the insulating substrate 2 by processes similar to those of forming the switching elements 10.

In the liquid crystal display panel 1 shown in FIG. 7, the scan signal circuit 60, video signal circuit 50 and booster circuit 4 can be formed on the same substrate. The number of external components can be reduced and a space for mounting components can be broadened. Connection reliability of components can also be improved.

2. Second Embodiment

The booster circuit according to the second embodiment uses two basic booster circuits which are operated in parallel to obtain a large output current.

Generally, a large charge/discharge current flows as a gate scan circuit of a liquid crystal display device is driven, because there are wiring capacitance and the like of gate wirings. This charge/discharge current is supplied from high voltage VGH and low voltage VGL power supply circuits. These circuits are therefore required to supply a large output current. VGH and VGL voltages correspond to gate voltages for turning on and off a TFT. It is therefore required that a change in VGH and VGL output voltages is small even an output current is made large.

Figure 8:
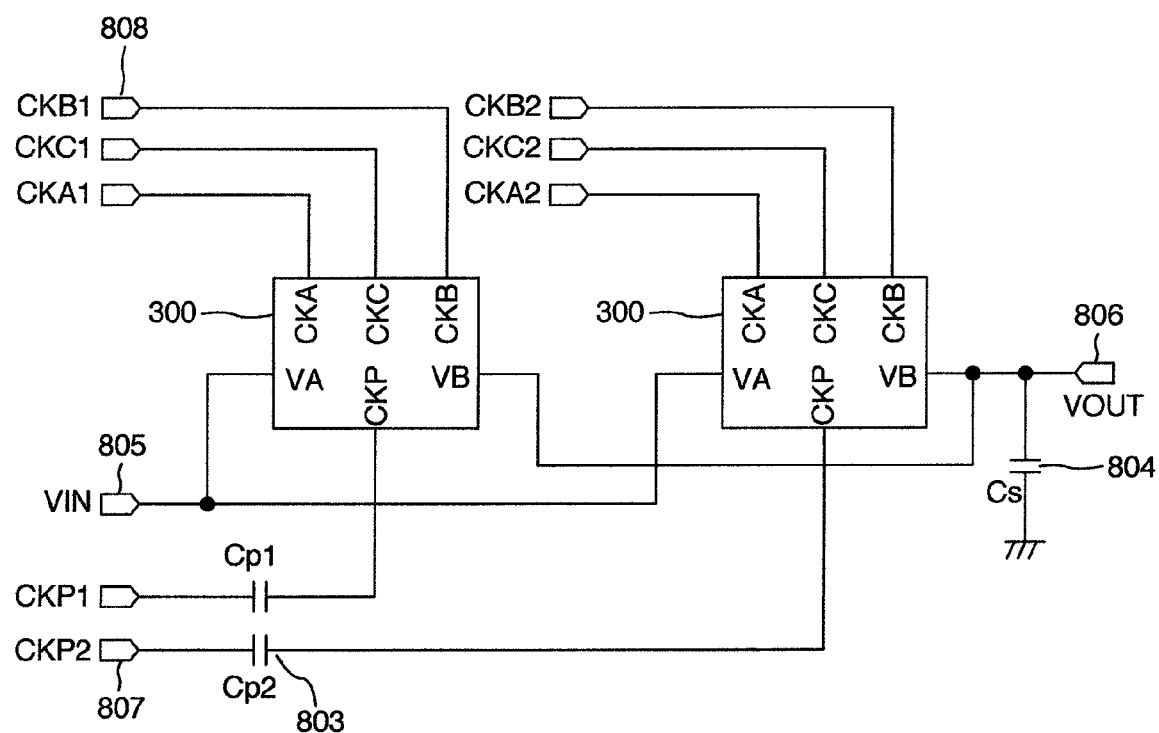
FIG. 8 is a diagram showing a high voltage VGH booster circuit according to a second embodiment of the present invention.
Figure 9:
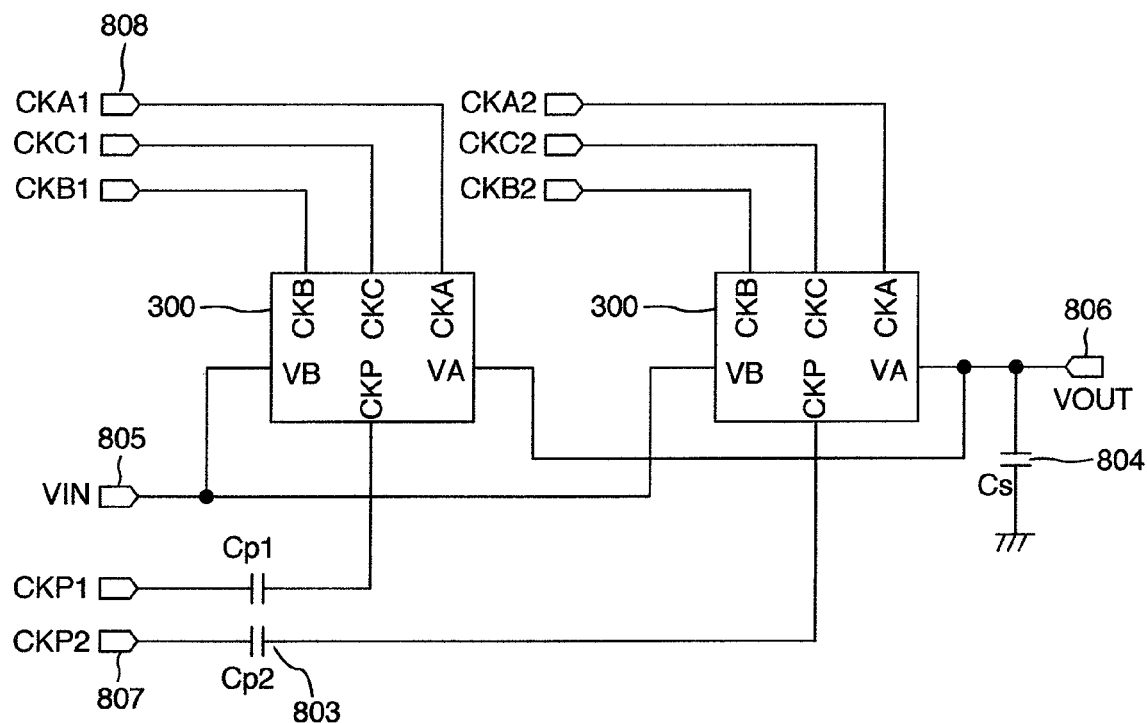
FIG. 9 is a diagram showing a low voltage VGL booster circuit of the second embodiment of the present invention.
Figure 10:
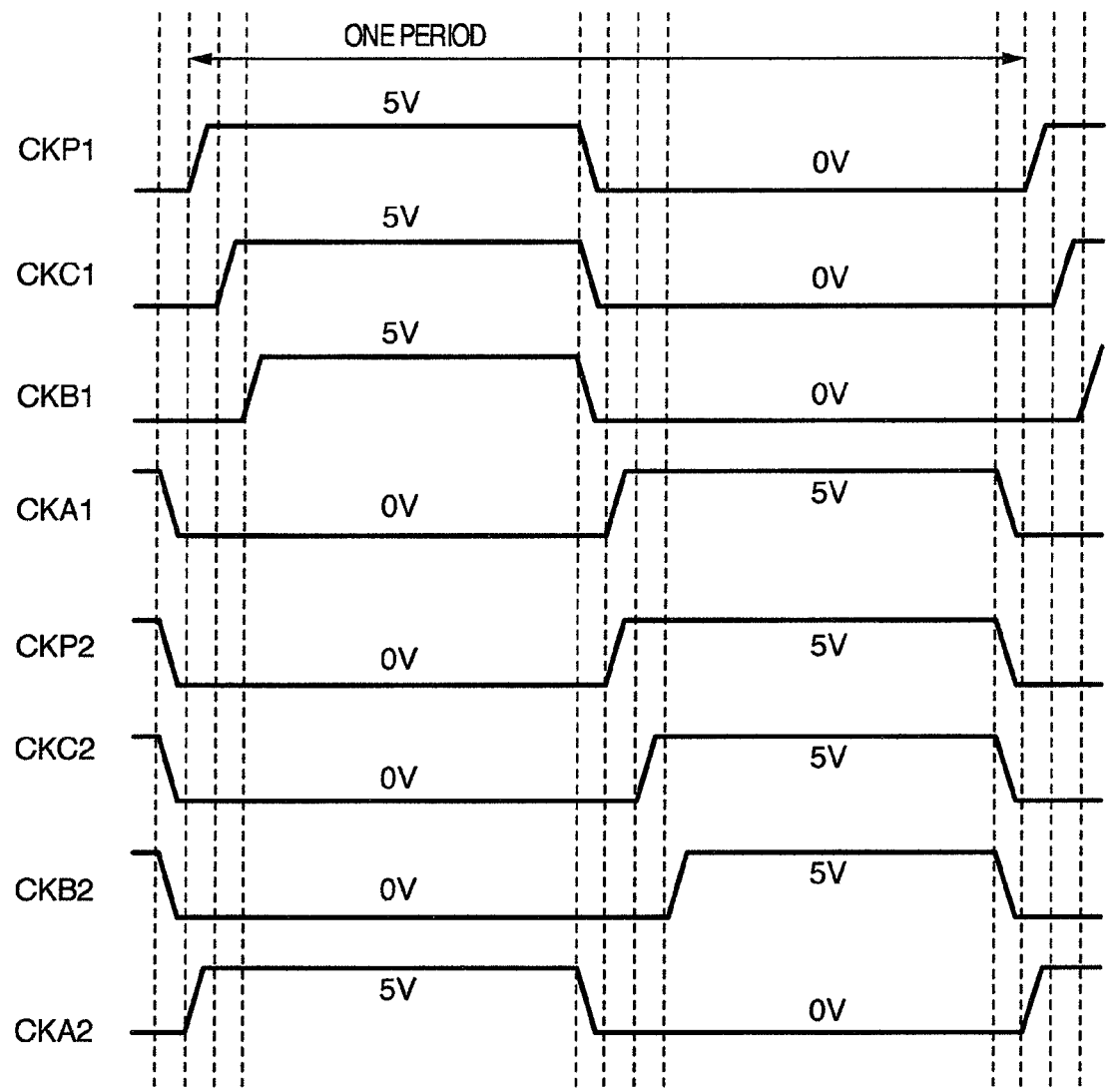
FIG. 10 is a diagram showing clock waveforms of the booster circuit of the second embodiment of the present invention.

With reference to FIGS. 8, 9 and 10, description will be made on the booster circuit according to the second embodiment of the present invention.

FIG. 8 shows a high voltage VGH booster circuit of the second embodiment. This booster circuit is constituted of two basic booster circuits 300 connected in parallel. Reference numeral 803 represents a booster capacitor element, and reference numeral 804 represents a stabilizing capacitor element. The basic booster circuit 300 is the same as the VGH booster circuit (FIG. 3) of the first embodiment, and the description of the circuit structure is omitted.

The operation of the booster circuit will be described with reference to FIG. 10. The phase relation of control clocks CKA1, CKB1, CKC1 and CKP1 of a first booster circuit is the same as that of the first embodiment, and the phase relation of control clocks CKA2, CKB2, CKC2 and CKP2 of a second booster circuit is also the same as that of the first embodiment. Each of the first and second booster circuits raises an input voltage and supplies currant to the output side, similar to the VGH booster circuit of the first embodiment.

In this embodiment, as shown in FIG. 10, the control clocks of the first and second booster circuits are shifted by a half period each other so that each booster circuit alternately supplies current to the output side. Therefore, as compared to a single booster circuit, the booster circuits can supply a two-fold current to the output side.

FIG. 9 shows a low voltage VGL booster circuit according to the second embodiment. The VGL booster circuit of the second embodiment has the input/output relation reversed from that of the VGH booster circuit, similar to the VGL booster circuit of the first embodiment. Similar to the VGH booster circuit, two VGL basic booster circuits are operated in parallel by shifting a phase by a half period to obtain a two-fold output current. Control clocks are the same as those of the VGH booster circuit, and the description thereof is omitted.

The structure of a display device using the power source circuit of the second embodiment is the same as that of the first embodiment, and the description thereof is omitted.

3. Third Embodiment

A booster circuit according to the third embodiment of the present invention has two or more charge pumping circuits connected serially to sequentially raise an input voltage and obtain a higher voltage VGH and a lower voltage VGL.

With reference to FIGS. 11, 12, 13 and 14 description will be made on the booster circuit according to the third embodiment of the present invention.

Figure 11:
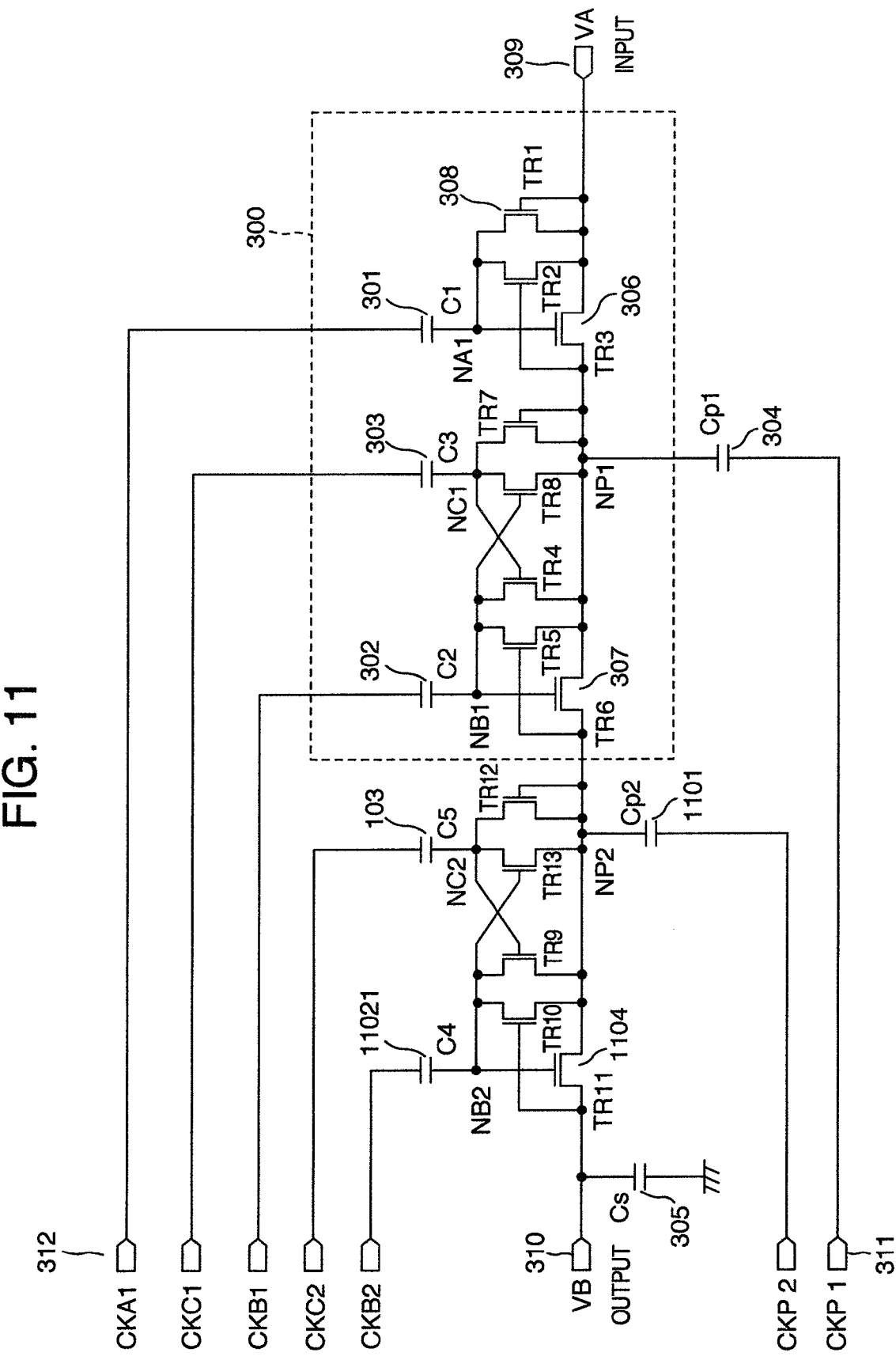
FIG. 11 is a diagram showing a high voltage VGH booster circuit according to a third embodiment of the present invention.

FIG. 11 shows a high voltage VGH booster circuit of the third embodiment. This booster circuit is constituted of two high voltage VGH charge pumping circuits connected serially. A voltage output from a first charging pump circuit 300 is raised further by using a second charge pumping circuit to obtain a higher voltage VGH. In this circuit, a charge transfer switch on the input side of the second charge pumping circuit is used also as a charge transfer switch on the output side of the first charge pumping circuit.

Figure 12:
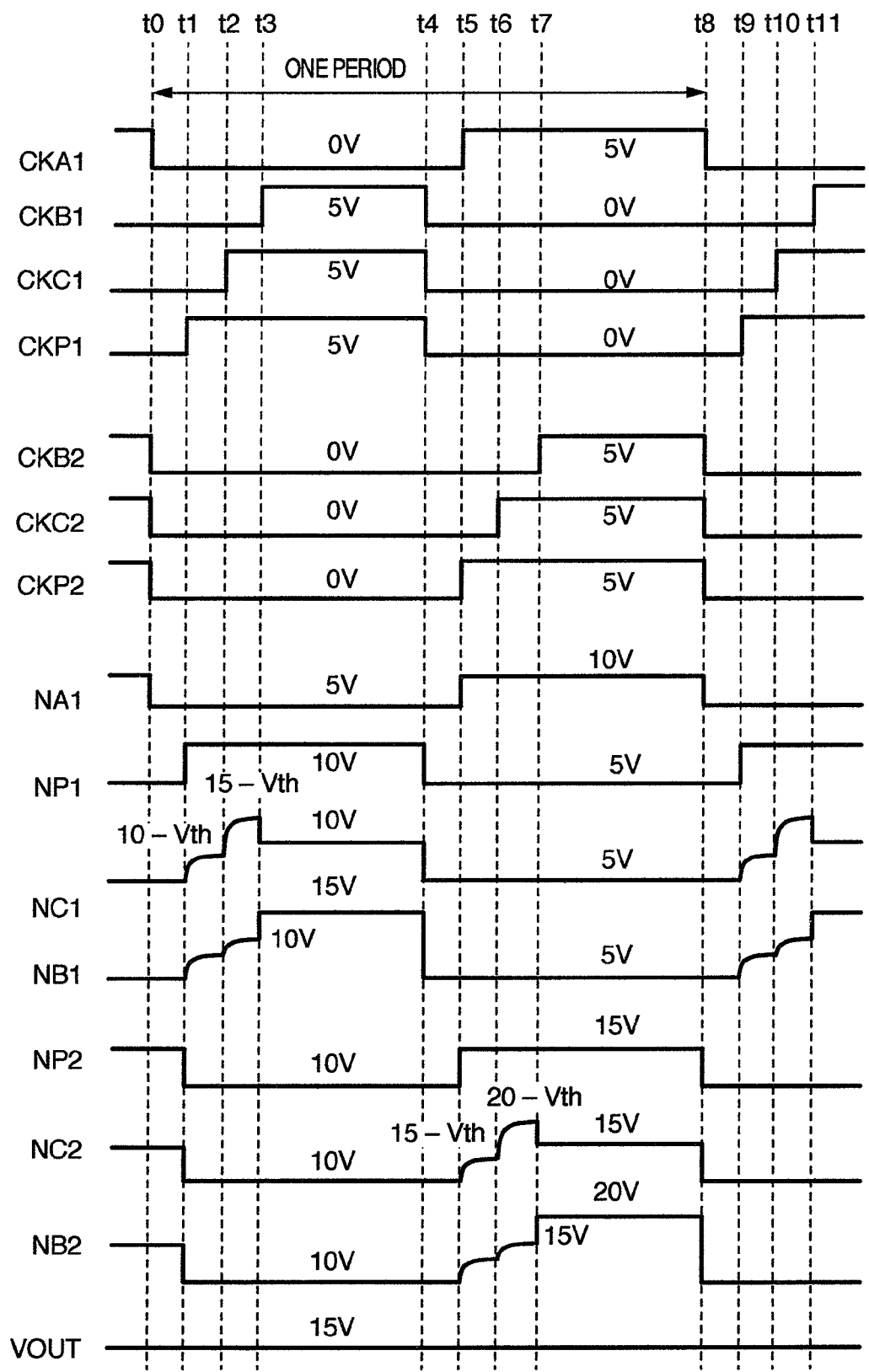
FIG. 12 is a diagram showing waveforms at respective points of the booster circuit of the third embodiment of the present invention.

FIG. 12 is a timing chart illustrating the operation of the booster circuit. As seen from FIG. 12, the phase relation of control clocks CKA1, CKB1, CKC1 and CKP1 of the first charge pumping circuit is the same as that of the first embodiment, and the phase relation of control clocks CKB2, CKC2 and CKP2 of the second charge pumping circuit is also the same as that of the first embodiment. Therefore, the first and second booster circuits raise an input voltage and supplies current to the output side, similar to the VGH booster circuit of the first embodiment. As shown in FIG. 12, the booster circuit shifts the phases of control clocks of the first and second charge pumping circuits by a half period each other. Therefore, during the period while the first charge pumping circuit charges an input voltage VA to a pumping capacitor element Cp1, charges accumulated in a pumping capacitor element Cp2 of the second charge pumping circuit are supplied to the output side, and conversely, during the period while the first charge pumping circuit supplies charges to the pumping capacitor element Cp1, these charges are charged to the pumping capacitor element Cp2 by the second booster circuit. These two states are repeated alternately so that a constant current can be supplied to the output side and a higher output voltage can be obtained than a single charge pumping circuit is used. For example, assuming that an input voltage VA is 5 V and a pumping clock amplitude is 5 Vpp, an output voltage of the first charge pumping circuit is 10 V and an output voltage of the second charge pumping circuit is 15 V.

The details of the operation of the booster circuit will be described in detail with reference to FIG. 12. Description will be made assuming that an input voltage VA is 5 V and an amplitude of the control clocks CKA1, CKB1, CKC1, CKP1, CKB2, CKC2 and CKP2 is 5 Vpp. A circuit portion (300) surrounded by a broken line in FIG. 11 is the same as the circuit described in the first embodiment, and the control clock timings are the same as those of the first embodiment. Therefore, similar to the first embodiment, the booster circuit raises an input voltage VA of 5 V and outputs a voltage of 10 V, similar to the first embodiment. Since the detailed operation of the circuit portion (300) surrounded by the broken line has already been given in the first embodiment, the description is omitted. The operation of the other circuit portion is as follows. As the circuit portion (300) surrounded by the broken line outputs a voltage of 10 V, a node NP2 is charged to 10 V, and as CKP2 becomes high at time t5, the node NP2 is raised to 15 V. At this time, a node NC2 is charged near to 15−Vth via TR12. As CKC2 becomes high at time t6, NC2 is charged once to 20 V. As CKB2 becomes high at time t7, NB2 (gate voltage of TR11) is raised to 20−Vth and TR11 turns on. As a result, charges in Cp are supplied to the output side via TR11 and the output side is supplied with a voltage of 15 V. Namely, the newly added circuit portion operates to raise the voltage of 10 V output from the circuit portion (300) surrounded by the broken line, to the voltage of 15 V. Therefore, by repeating a series of these operations, the whole circuit combining the newly added circuit portion and the circuit portion (300) surrounded by the broken line can raise the input voltage of 5 V to the output voltage of 15 V.

In the circuit shown in FIG. 11, two voltage booster operations can supply a sufficiently high gate voltage to the gates of the charge transfer switches TR6 and TR11. It is therefore possible to lower a switch on-resistance, suppress the influence of Vth variation, and realize good power supply circuit characteristics.

Figure 13:
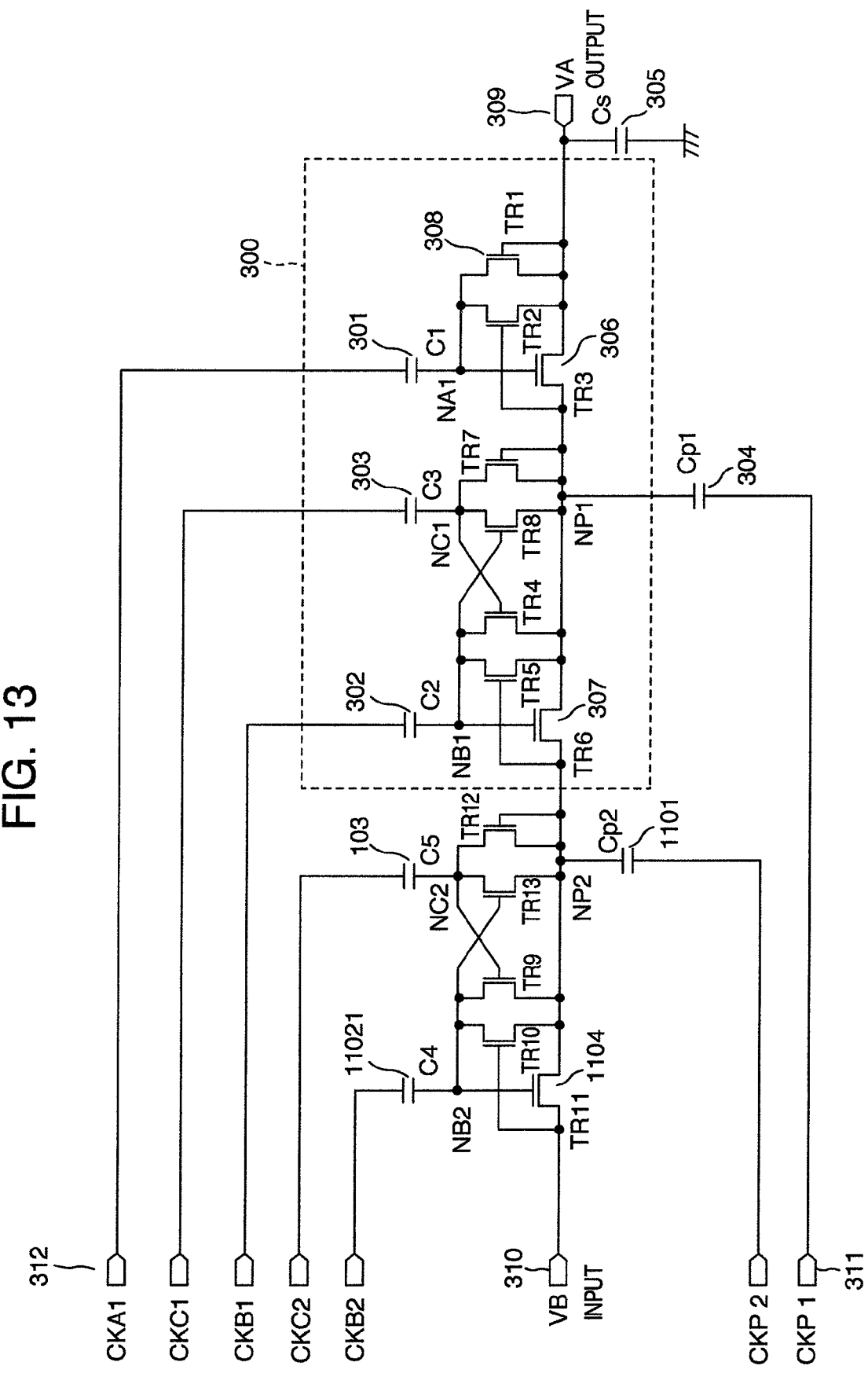
FIG. 13 is a diagram showing a low voltage VGL booster circuit of the third embodiment of the present invention.

FIG. 13 shows a low voltage VGL booster circuit of the third embodiment. Similar to the VGL circuit of the first embodiment, the VGL circuit of the third embodiment has an input/output relation reversed from that of the VGH circuit. Similar to the VGH booster circuit, two charge pumping circuits are connected serially and operated by shifting the phases by a half period each other so that a lower VGL voltage can be obtained than a single charge pumping circuit is used. For example, if an input voltage VB is 3 V and a pumping amplitude is 5 Vpp, an output voltage of the second charge pumping circuit is −2 V and an output voltage of the first charge pumping circuit is −7 V.

Figure 14:
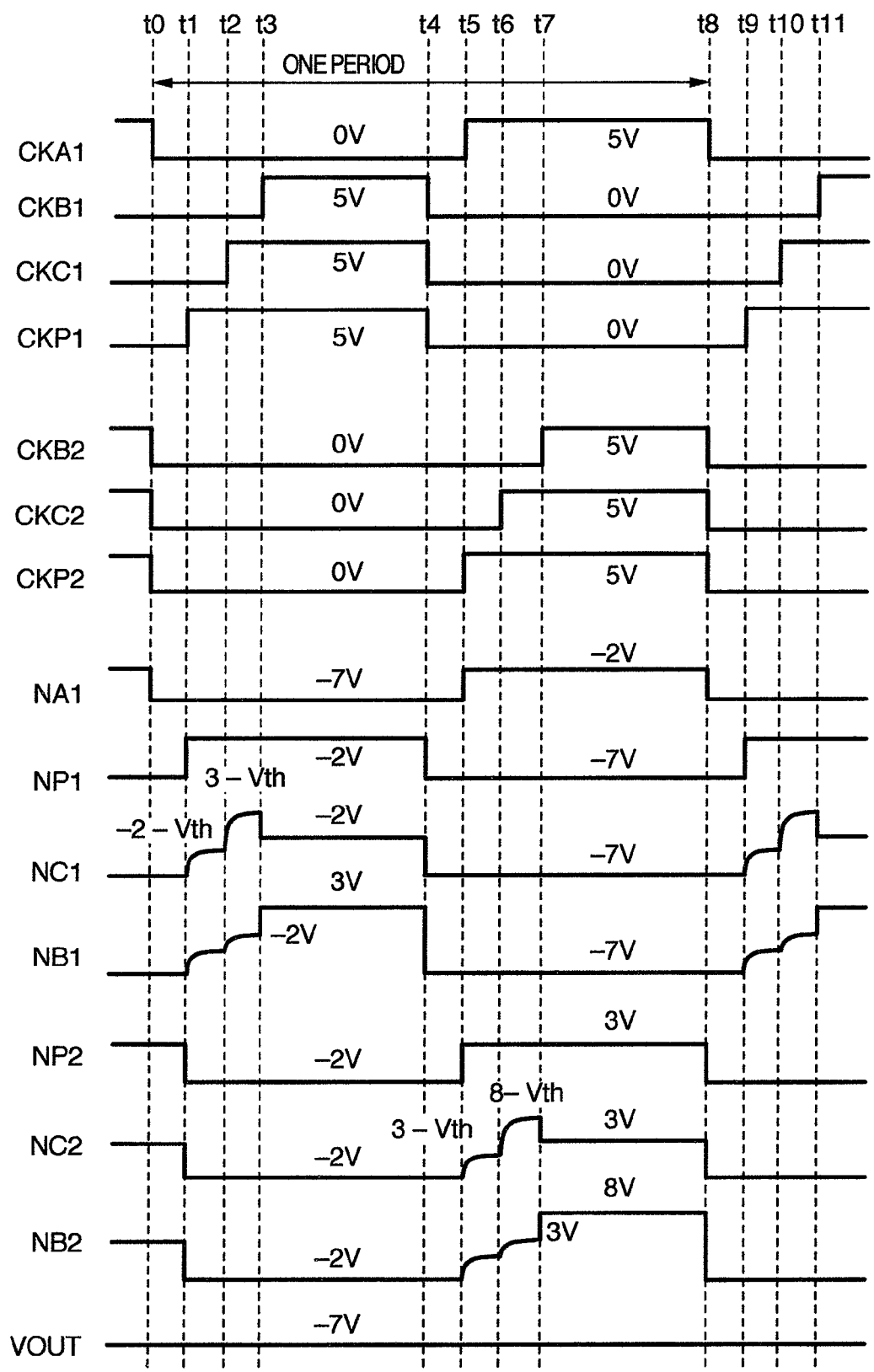
FIG. 14 is a diagram showing waveforms at respective points of the booster circuit of the third embodiment of the present invention.

FIG. 14 is a timing chart illustrating the operation of the VGL circuit. As seen from FIG. 14, the phase relation of control clocks CKA1, CKB1, CKC1 and CKP1 of the first charge pumping circuit is the same as that of the first embodiment, and the phase relation of control clocks CKB2, CKC2 and CKP2 of the second charge pumping circuit is also the same as that of the first embodiment. Therefore, the first and second booster circuits convert an input voltage into a low level voltage and supply current to the output side, similar to the VGL circuit of the first embodiment. As shown in FIG. 14, the VGL circuit shifts the phases of control clocks of the first and second charge pumping circuits by a half period each other. Therefore, during the period while a current flows into the pumping capacitor element Cp1 from the output VA in the first charge pumping circuit, charges accumulated in the pumping capacitor element Cp2 of the second charge pumping circuit are supplied to the input side, and conversely, during the period while the first charge pumping circuit supplies charges in the pumping capacitor element Cp1, the charges are charged to the pumping capacitor element Cp2 by the second booster circuit. These two states are repeated alternately so that charges are steadily transferred from the output VA to the input VB, and a lower output voltage can be obtained than a single charge pumping circuit is used. For example, assuming that an input voltage VA is 5 V and a pumping clock amplitude is 5 Vpp, an output voltage of the second charge pumping circuit is −2 V and an output voltage of the first charge pumping circuit is −7 V. With reference to FIG. 14, the details of the operation of the VGL circuit will be described. Description will be made assuming that an input voltage VA is 5 V and an amplitude of the control clocks CKA1, CKB1, CKC1, CKP1, CKB2, CKC2 and CKP2 is 5 Vpp. As the input voltage VB of 3 V is applied in the state that the pumping clock CKP2 is high and as CKB2 becomes high at time t7, TR11 turns on so that the node NP2 is discharged to the input voltage VB of 3 V (voltage across CP2 is 3 V−5 V=−2 V). Next, as CKB2 and CKC2 become low at time t8, TR11 turns off. At this time, CKP2 also becomes low and NP2 takes a voltage of −2 V. Therefore, a newly added circuit portion outside a circuit portion (300) surrounded by a broken line operates to convert the input voltage VB of 3 V into −2 V and supply this converted voltage to the circuit portion (300) surrounded by the broken line. As described in detail in the first embodiment, the circuit portion (300) surrounded by the broken line operates to lower the input voltage by 5 V and supply the lowered voltage to the output side. Therefore, in this case, the input voltage is lowered by 5 V to convert the voltage of −2 V into −7 V and output the voltage of −7 V. The internal operation of the circuit portion (300) surrounded by the broken line has been described in detail in the first embodiment, and the description thereof is omitted. Therefore, by repeating a series of these operations, the whole circuit combining the newly added circuit portion and the circuit portion (300) enclosed by the broken line can convert the input voltage VB of 3 V into −7 V and output the converted voltage.

Also in the circuit shown in FIG. 13, two voltage booster operations can supply a sufficiently high gate voltage to the gates of the charge transfer switches TR6 and TR11. It is therefore possible to lower a switch on-resistance, suppress the influence of a Vth variation, and realize good power supply circuit characteristics.

It is needless to say that three or more charge pumping circuits may be connected serially based upon the similar concept, and shifted in phase by a half period each other to obtain a much higher voltage VGH and much lower voltage VGL.

The structure of a display device using the power source circuit of the third embodiment is the same as that of the first embodiment, and the description thereof is omitted.

The voltage converter circuit of the present invention is applicable to a booster circuit to be used for generating power supply voltages at which a display device is driven.

The display device of the present invention is applicable to a display device to be mounted on a mobile phone.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A voltage converter circuit for converting an input voltage and outputting a converted voltage, comprising
first to eighth transistors and first to fifth capacitor elements,
wherein:
a drain and a gate of said first transistor are connected to a first terminal, and a source of said first transistor is connected to a first node;
a drain of said second transistor is connected to said first terminal, a gate of said second transistor is connected to a second node, and a source of said second transistor is connected to said first node;
a drain of said third transistor is connected to said first terminal, a gate of said third transistor is connected to said first node, and a source of said third transistor is connected to said second node;
a drain of said fourth transistor is connected to said second node, a gate of said fourth transistor is connected to a third node, and a source of said fourth transistor is connected to a fourth node;
a drain of said fifth transistor is connected to said second node, a gate of said fifth transistor is connected to a second terminal, and a source of said fifth transistor is connected to said fourth node;
a drain of said sixth transistor is connected to said second node, a gate of said sixth transistor is connected to said fourth node, and a source of said sixth transistor is connected to said second terminal;
a drain and a gate of said seventh transistor are connected to said second node, and a source of said seventh transistor is connected to said third node;
a drain of said eighth transistor is connected to said second node, a gate of said eighth transistor is connected to said fourth node, and a source of said eighth transistor is connected to said third node;
said first capacitor element is connected between a first control signal input terminal and said first node;
said second capacitor element is connected between a second control signal input terminal and said fourth node;
said third capacitor element is connected between a third control signal input terminal and said third node;
said fourth capacitor element is connected between a fourth control signal input terminal and said second node;
said fifth capacitor element is connected at least either between said second terminal and ground or between said first terminal and ground; and
first to fourth control signals having different timings are input to said first to fourth control signal input terminals, respectively.

2. The voltage converter circuit according to claim 1, wherein said first to fourth control signals have pulse waveforms, and when representing rise and fall timings of said first to fourth control signals by tA1, tA2, tB1, tB2, tC1, tC2, tP1 and tP2, respectively, said timings are, in the earlier order, tP1, tC1, tB1, tP2=tC2=tB2, tA1 and tA2.

3. A voltage converter circuit wherein two or more voltage converter circuits recited in claim 1 are connected in parallel, and phases of said first to fourth control signals are reversed between both said voltage converter circuits to supply current from said two or more voltage converter circuits to a common output terminal.

4. The voltage converter circuit according to claim 1, wherein said first to eighth transistors are made of NMOS single channel transistors.

5. The voltage converter circuit according to claim 1, wherein:
initial voltages are applied to said first and second capacitor elements via said first and fourth transistors, respectively, and voltages applied to the gates of said third and sixth transistors are raised in accordance with said first and second control signals, respectively to switch between said third and sixth transistors; and
an initial voltage is applied to said third capacitor element via said seventh transistor, a voltage applied to the gate of said fourth transistor is raised in accordance with said third control signal to raise a voltage applied to said fourth node.

6. A display device having the voltage converter circuit recited in claim 1, comprising:
a display panel having a plurality of pixel electrodes disposed in a matrix shape;
a switching element for supplying a video signal to each of said pixel electrodes;
a video signal line for supplying said video signal to said switching element;
a scan signal line for supplying a scan signal which controls said switching element;
a first drive circuit for outputting said video signal, said first drive circuit being formed on said display panel by processes similar to processes of forming said switching element; and
a second drive circuit for outputting said scan signal,
wherein the voltage converter circuit recited in claim 1 is formed in said display panel by the processes similar to the processes of forming said switching element.

7. A display device having the voltage converter circuit recited in claim 1 wherein voltages generated by the voltage converter circuit recited in claim 1 are used for drive voltages of the display device.

8. A voltage converter circuit for converting an input voltage and outputting a converted voltage, comprising
first to eighth transistors and first to fifth capacitor elements,
wherein:
a drain and a gate of said first transistor are connected to a first terminal, and a source of said first transistor is connected to a first node;
a drain of said second transistor is connected to said first terminal, a gate of said second transistor is connected to a second node, and a source of said second transistor is connected to said first node;
a drain of said third transistor is connected to said first terminal, a gate of said third transistor is connected to said first node, and a source of said third transistor is connected to said second node;
said first capacitor is connected between a first control signal input terminal and said first node;
one or a plurality of circuit blocks are serially connected between the source of said third transistor and a second terminal, and in each said circuit block,
a drain of said fourth transistor is connected to said second node, a gate of said fourth transistor is connected to a third node, and a source of said fourth transistor is connected to a fourth node; a drain of said fifth transistor is connected to said second node, a gate of said fifth transistor is connected to said second terminal, and a source of said fifth transistor is connected to said fourth node; a drain of said sixth transistor is connected to said second node, a gate of said sixth transistor is connected to said fourth node, and a source of said sixth transistor is connected to said second terminal; a drain and a gate of said seventh transistor are connected to said second node, and a source of said seventh transistor is connected to said third node; a drain of said eighth transistor is connected to said second node, a gate of said eighth transistor is connected to said fourth node, and a source of said eighth transistor is connected to said third node; said second capacitor element is connected between a second control signal input terminal and said fourth node; said third capacitor element is connected between a third control signal input terminal and said third node; said fourth capacitor element is connected between a fourth control signal input terminal and said second node,
wherein said circuit block uses the gate of said seventh transistor as an input from a previous block and the source of said sixth transistor as an output to a next block;
said fifth capacitor element is connected at least either between said second terminal and ground or between said first terminal and ground; and
first to fourth control signals having different timings are input to said first to fourth control signal input terminals, respectively.

9. The voltage converter circuit according to claim 8, wherein when representing said second to fourth control signals of said circuit block by CKB1, CKC1, CKP1, CKB2, CKC2, CKP2, . . . , CKBn, CKCn, CKPn and representing rise and fall timings of said second to fourth control signals by tBn1, tBn2, tCn1, tCn2, tpn1 and tPn2, said timings are, in the earlier order, tPn1, tCn1, tBn1, tPn2=tCn2=tBn2.

10. The voltage converter circuit according to claim 8, said second to fourth control signals of each of said circuit blocks have a phase shifted by a half period for each of said circuit blocks.

11. The voltage converter circuit according to claim 8, wherein said first to eighth transistors are made of NMOS single channel transistors.

12. A display device having the voltage converter circuit recited in claim 8, comprising:
a display panel having a plurality of pixel electrodes disposed in a matrix shape;
a switching element for supplying a video signal to each of said pixel electrodes;
a video signal line for supplying said video signal to said switching element;
a scan signal line for supplying a scan signal which controls said switching element;
a first drive circuit for outputting said video signal, said first drive circuit being formed on said display panel by processes similar to processes of forming said switching element;
a second drive circuit for outputting said scan signal,
wherein the voltage converter circuit recited in claim 8 is formed in said display panel by the processes similar to the processes of forming said switching element.

13. A display device having the voltage converter circuit recited in claim 8 wherein voltages generated by the voltage converter circuit recited in claim 8 are used for drive voltages of the display device.

* * * * *